United States Patent [19]
Sievers

[11] 3,818,770
[45] June 25, 1974

[54] ADJUSTABLE LENGTH CAM SHUTTLE
[75] Inventor: Robert W. Sievers, St. Clair Shores, Mich.
[73] Assignee: Motion Manufacturing, Inc., Detroit, Mich.
[22] Filed: Feb. 18, 1972
[21] Appl. No.: 227,415

[52] U.S. Cl. .................................. 74/57, 242/158.5
[51] Int. Cl. ........................................... F16h 25/12
[58] Field of Search ............ 74/57, 597; 242/158.3, 242/158.5

[56] References Cited
UNITED STATES PATENTS
3,279,279  10/1966  Takebayashi .......................... 74/597
3,398,904   8/1968  Adams et al. ............................ 74/57

FOREIGN PATENTS OR APPLICATIONS
505,200  10/1951  Belgium ........................... 242/158.5
339,695   8/1959  Switzerland ............................. 74/57

Primary Examiner—Samuel Scott
Assistant Examiner—Wesley S. Ratliff, Jr.
Attorney, Agent, or Firm—Barnes, Kisselle, Raisch & Choate

[57] ABSTRACT

A shuttle with a table reciprocated by a cylindrical cam drive assembly carried by bed sections. The cam drive assembly has at least two and preferably three cam sections, to provide varying lengths and rate of travel for reciprocating the table by changing one of the cam sections and inserting an extension between the bed sections to carry the table for reciprocation.

24 Claims, 5 Drawing Figures

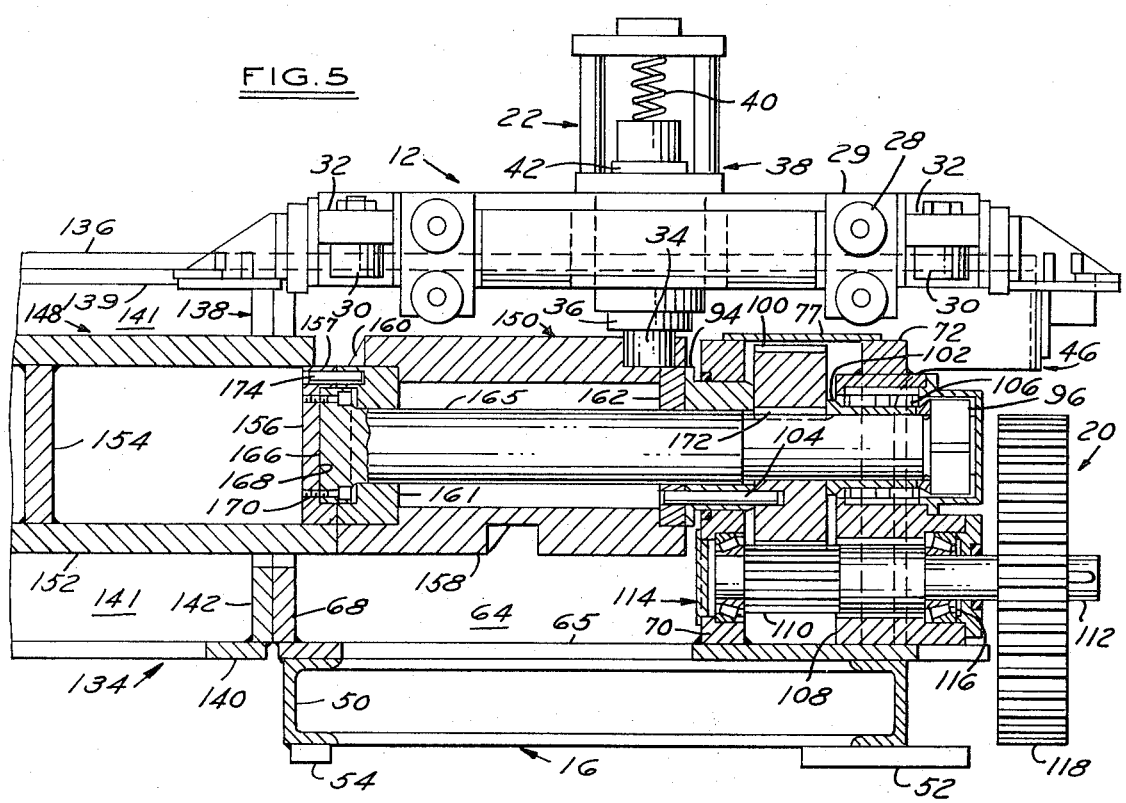
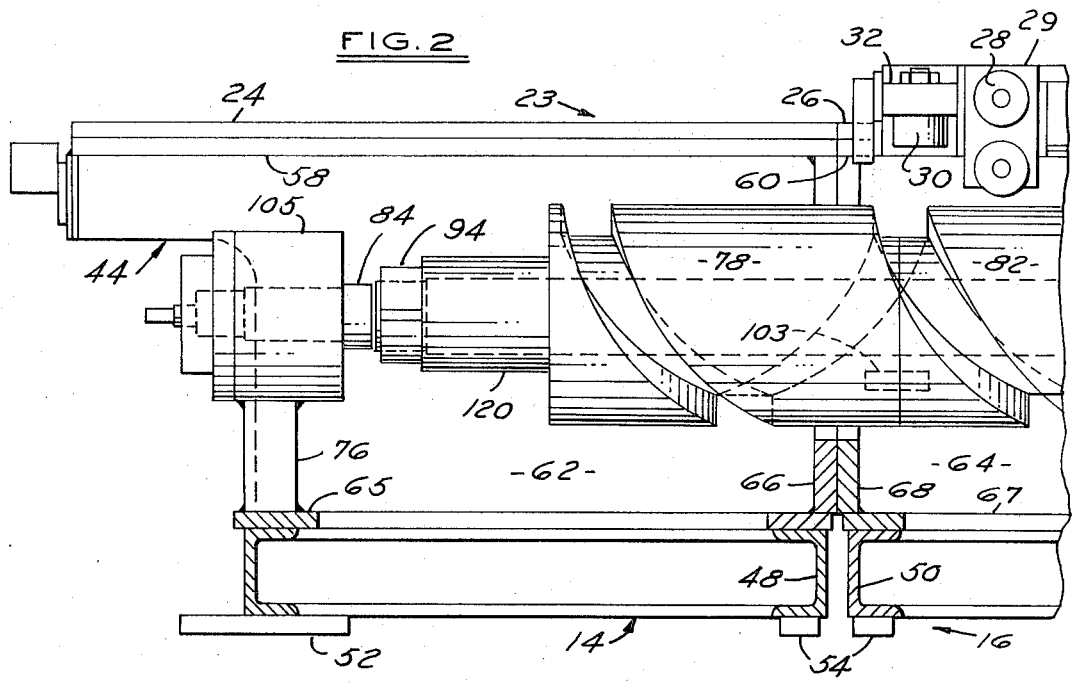

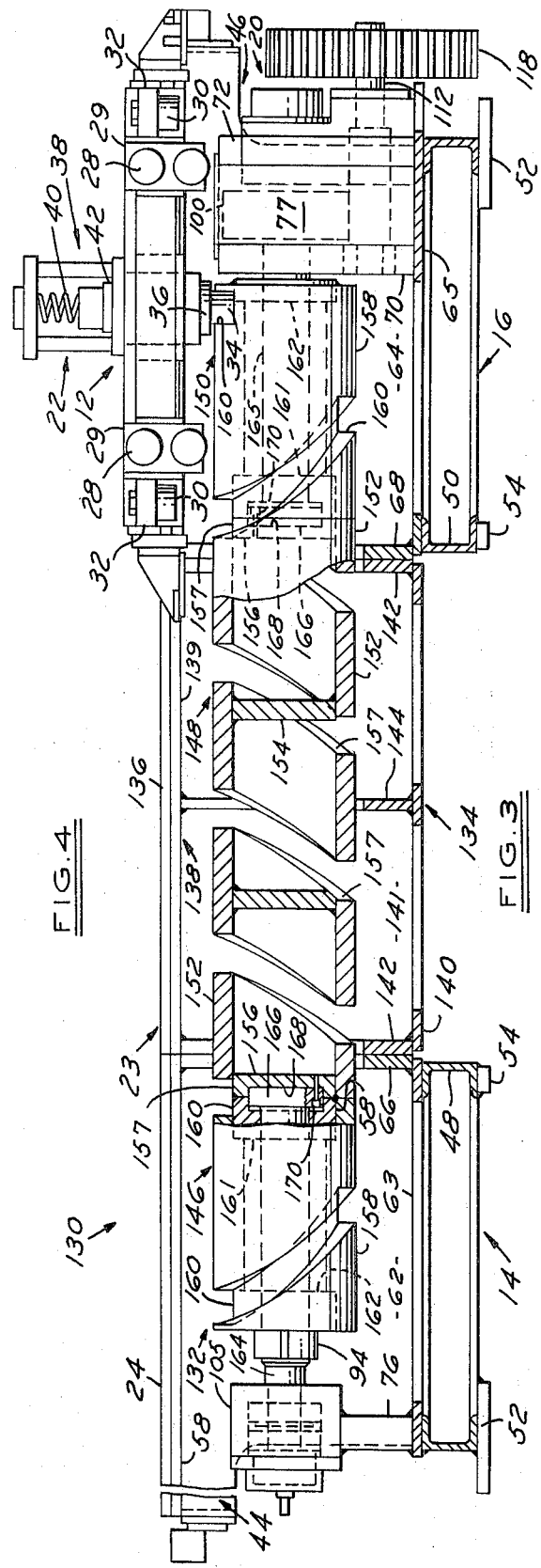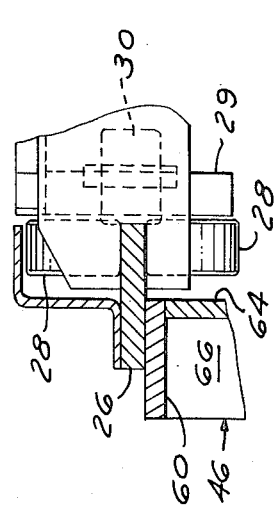

ADJUSTABLE LENGTH CAM SHUTTLE

This invention relates to material shuttle or transfer devices and more particularly to an adjustable length cam drive shuttle for conveyors, machine tools, transfer lines with movable tables or pallets, and the like.

Solid one-piece cylinders with a generally helical groove therein have been used as drive cams in shuttles for conveyors, machine tools, transfer lines and the like. Such drive cams are individually designed and made by machining the desired helical groove in a blank cylinder for each particular application or shuttle design and thus are relatively expensive and cannot readily be adapted for use in other shuttles. In longer lengths, such solid cylindrical cams are difficult to stop at predetermined precise angular positions due to their inertia and angular momentum.

Objects of this invention are to provide a cam driven shuttle and a cam drive therefor which can be readily adapted to provide and accommodate various rates and lengths of travel, can be readily stopped at a preselected angular position, and is of economical manufacture and assembly.

These and other objects, features and advantages of this invention will be apparent from the following detailed description, appended claims and accompanying drawings in which:

FIG. 2 is a fragmentary sectional view of the shuttle of FIG. 1 with a multiple section cam drive with two cam sections and a spacer received on an arbor.

FIG. 3 is a fragmentary sectional view on line 3—3 of FIG. 1.

FIG. 4 is a sectional view of a shuttle having the table and bed sections of FIG. 1 with a way extension therebetween and a three section cam drive.

FIG. 5 is an enlarged fragmentary sectional view of the shuttle of FIG. 4.

Figure 1:
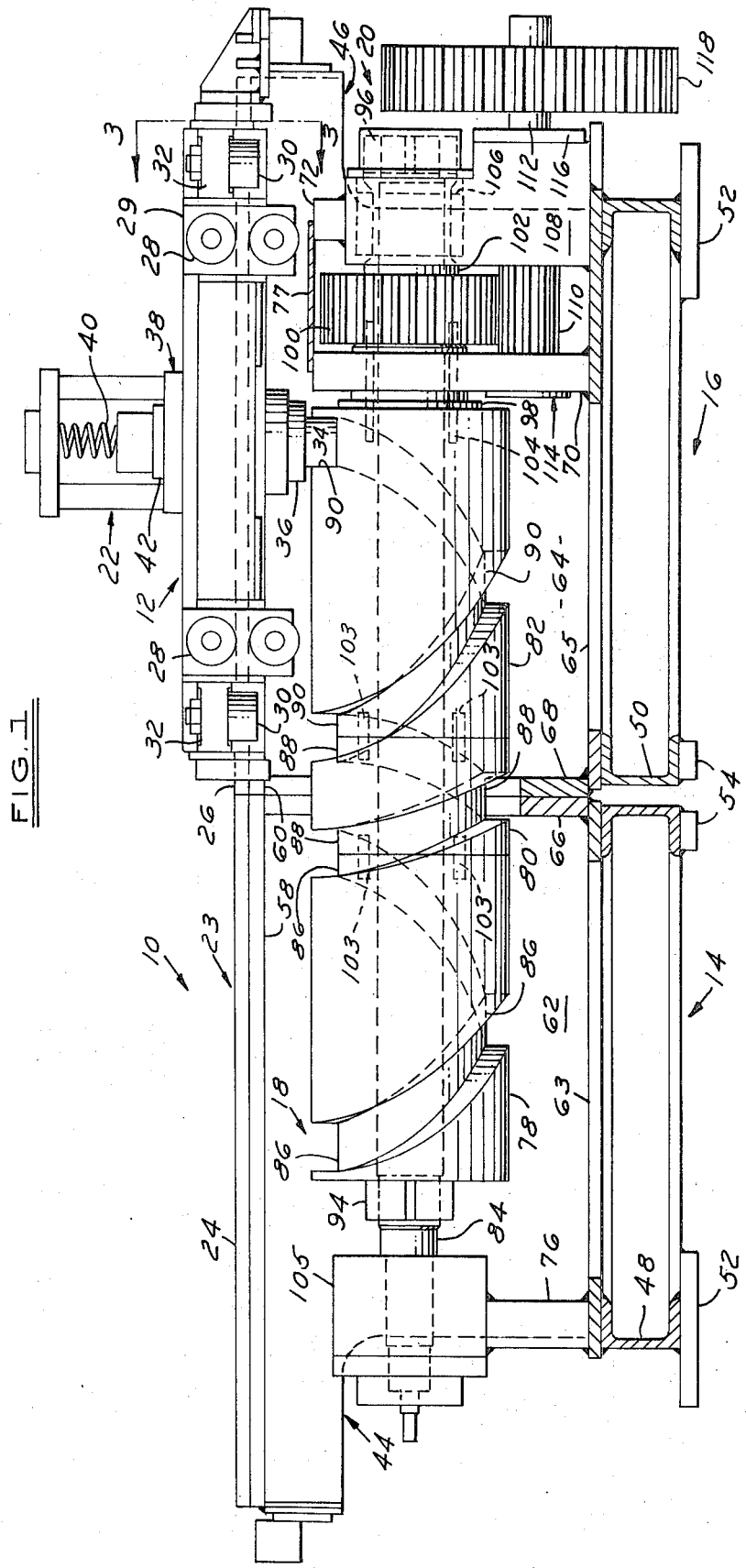
FIG. 1 is a longitudinal sectional view of a shuttle with a reciprocating table mounted on abutting bed sections and driven by a multiple section cam embodying this invention.

Referring in more detail to the drawings, FIG. 1 illustrates a power shuttle 10 with a table 12 mounted for generally longitudinally reciprocation on two abutting rectangular bed sections 14 and 16. A cylindrical cam assembly 18 rotated by a driving mechanism 20 imparts longitudinal movement to table 12 through cam follower assembly 22 fixed to the table. Table 12 is mounted for reciprocation on a pair of longitudinally extending spaced ways or rails 23 with each way having two abutting sections 24 and 26 carried by bed sections 14 and 16. As shown in FIGS. 1 and 3, table 12 is carried on ways 23 by four sets of vertically spaced rollers 28 engaging the upper and lower faces of the ways and mounted on a plate 29 fixed to table 12. To prevent table 12 from shifting laterally on ways 23, four rollers 30 engaging the inner edges thereof are mounted on brackets 32 fixed to the table. Cam follower assembly 22 has a cam follower 34 mounted on a vertical shaft 36 slidably received in a housing 38 fixed to table 12. A spring 40 yieldably urges shaft 36 vertically downward to engage cam follower 34 in the cam track of assembly 18 and a retaining ring 42 limits the extent to which cam follower 34 can be shifted vertically downward.

The pairs of way sections 24 and 26 are fixed to laterally spaced pairs of vertically extending supports 44 and 46 carried by generally rectangular channel iron bases 48 and 50 of bed sections 14 and 16 with foot pads 52 and 54 fixed to the lower faces thereof. Supports 44 and 46 have spaced way carrier plates 58 and 60 fixed to vertically extending side plates 62 and 64 fixed at their lower edges to apertured mounting plates 63 and 65 fixed to bases 48 and 50. Bed sections 14 and 16 are aligned with and connected to each other through abuttment plates 66 and 68 extending transversely between and fixed to side plates 62 and 64 of the supports and also fixed to mounting plates 63 and 65 respectively. Bearing mounting plates 70 and 72 extend between and are fixed to side plates 64 of bed section 16 adjacent its outboard end and a bearing support plate 76 extends transversely between and is fixed to sidewalls 62 of bed section 14 adjacent its outboard end. A drive housing cover 77 is received between bearing mounting plates 70 and 72.

Cam assembly 18 has three generally cylindrical sections 78, 80 and 82 mounted on an arbor shaft 84 carried by bed sections 14 and 16. Cylinders 78, 80 and 82 have interconnecting cam track sections 86, 88 and 90 therein adapted to receive cam follower 34. Preferably, cam tracks 86 and 90 have changing pitches for providing accelerating and decelerating motion to table 12 and cam track 8 has a pitch for providing a constant speed motion to table 12 so that rotation of the cam sections in unison imparts an accelerating, constant speed, and decelerating movement to table 12 as it is transversed in one direction the length of ways 23. If desired, cylinders 78 and 82 can be of identical construction and merely turned end for end when mounted on arbor 84 to provide the desired accelerating and decelerating motion for table 12. Cylinders 78, 80 and 82 are retained on arbor 84 by jamb nuts 94 and 96 adjacent opposed ends thereof. A spacer collar 98, driven gear 100 and spacer spool 102 (FIG. 1) are received on arbor 84 between cylinder 82 and jamb nut 96. A plurality of axially extending pins 103 prevent the cylinders from rotating with respect to each other and axially extending pins 104 prevent the cylinders from rotating with respect to spacer collar 98 and gear 100. One end of shaft 84 is journalled in a bearing and housing assembly 105 fixed to support 76 of bed section 14 and the other end of shaft 84 is journalled in a bearing assembly 106 carried by a mounting block 108 fixed to bearing support 72 of bed section 16. Drive mechanism 20 for rotating cam assembly 18 has a pinion 110 meshing with driven gear 100 fixed by a key (not shown) to arbor shaft 84. Pinion 110 is fixed to a drive shaft 112 received for free rotation in bearing assemblies 114 and 116 carried by mounting plate 70 and mounting block 108. A gear 118 driven by a prime mover (not shown) is fixed to the free end of shaft 112 for rotating cam assembly 18.

If desired, an accelerating and decelerating motion only can be provided for table 12 by removing constant speed cam 80 from arbor 84 and using only cam sections 78 and 82 as shown in FIG. 2. When constant speed cam 80 is removed from arbor 84, cams 78 and 82 are placed in abutting relation and a spacer 120 is inserted over one end of the arbor so that cams 78 and 82 can be secured to the shaft for rotation therewith.

FIG. 4 illustrates a shuttle 130 with a table 12 reciprocated by a cam assembly 132 and carried by bed sections 14 and 16 with a way extension 134 therebetween. Way extension 134 allows the overall length of shuttle 130 to be altered and varied without modification of bed sections 14 and 16. Extension 134 has a pair of way sections 136 carried by a pair of laterally spaced side supports 138 fixed at their lower ends to a carrier plate 140. Each side support 138 has a way mounting plate 139 fixed to the upper edge of a vertical side plate 141 fixed at its lower edge to carrier plate 140. A pair of opposed abuttment plates 142 extend between and are fixed to side supports 138 and carrier plate 140. Abuttment plates 142 are adapted for engagement with abuttment plates 66 and 68 of bed sections 14 and 16 and are either releasably or fixedly connected thereto. An intermediate stiffening plate 144 extends transversely between and is fixed to side supports 138.

Cam assembly 132 has three cylindrical sections 146, 148 and 150 generally similar to the accelerating and decelerating and constant speed cylindrical cam sections of cam assembly 18. Constant speed cam section 148 has a hollow tube 152 with transversely extending intermediate and end support plates 154 and 156 fixed therein and a cam track 157. Preferably, cam track 157 is a slot extending through the sidewall of tube 152 and is machined therein after support plates 154 and 156 are fixed in the tube which decreases the cost of making cylindrical cam section 148. Similarly, accelerating and decelerating cam sections 146 and 150 have hollow cylindrical tubes 158 with a cam track 160 and generally opposed end plates 161 and 162 fixed therein. Cam assembly 132 is rotatively mounted in bed sections 14 and 16 by stub arbors or shafts 164 and 165 extending axially through cam sections 146 and 150 and journalled in bearing assemblies 105 and 106 carried by the bed sections. A flange 166 on one end of each shaft 164 and 165 is received in a pocket 168 in an end plate 156 of cam section 148 and is secured therein by cap screws 170. Cam section 146 is urged into firm abuttment with cam section 148 by jamb nut 94 threadily received on stub shaft 164. Gear 100 is connected to shaft 165 for rotation therewith by a key 172 (FIG. 5) and is also connected to cam section 150 by axially extending pins 104. Relative rotation between cam sections 146, 148 and 150 is prevented by pins 174, extending axially through end plates 156 and into end plates 161.

By the use of sectional cylindrical cam assemblies 18 and 132, way extension 134, and sectional beds 14 and 16, a wide variety of shuttles with different lengths of movement of table 12 can be readily provided. In various length sectional cam drive assemblies 18 and 132, accelerating and decelerating cylindrical cam sections 78, 82 and 146, 150 can be of standard design with only the center cylindrical cam sections 80 and 148 being specially designed for each particular shuttle length. As shuttles 10 and 130 are operated, the accelerating and decelerating cams 78, 82 and 146, 150 control the initial and final portion of the reciprocal movement of table 12 and if desired can be of identical construction and merely turned end for end to provide the initial and final cam track sections of assemblies 18 and 132. If desired, in shuttle 10, constant speed cam 80 can be eliminated and accelerating and decelerating cams 78 and 82 abutted with each other (as shown in FIG. 2) to provide only accelerating and decelerating motion for reciprocating table 12.

In operation of both shuttles 10 and 130, cam assemblies 18 and 132 are rotated first in one direction and then in the opposite direction by drive 20 to reciprocate table 12 back and forth along substantially the entire length of the ways. The length through which table 12 is reciprocated can be increased and decreased by installing longer and shorter center cam sections 80 and 150 in cam assemblies 18 and 132 and correspondingly dimensioned way extensions 134 between bed sections 14 and 16 of the shuttles. In shuttles with a long stroke or reciprocal movement of table 12, it is preferable to use hollow or tubular cam assemblies 132 because they have less mass and hence less inertia and angular momentum than cam assemblies 18 of comparable length. This comparatively lesser mass of hollow cam assemblies 132 facilitates stopping of the cam assemblies in predetermined angular positions and decreases the loads and stresses placed on the drive trains 20 when starting and stopping the cam assemblies. Moreover, it is less costly to make cam tracks in hollow tubular cylinders than in solid cylinders because it is easier and less expensive to machine a slot through the tube than a groove in the cylinder. Thus, hollow cam assemblies are of more economical construction than solid cam assemblies.

I claim:

1. An adjustable length cam shuttle comprising at least two separate bed sections, said bed sections being separable from each other and retained in fixed alignment with each other to carry a table for reciprocable movement thereon, a table carried by said bed sections for generally reciprocal movement with respect to said bed sections, a generally cylindrical cam drive assembly carried by at least two bed sections for rotation on its longitudinal axis, said cam drive assembly having at least first and second separate sections aligned on a common axis of rotation with each section having a separate cam track section thereon, said separate cam track sections being aligned with each other to provide a continuous cam track coiled about and extending along the common axis of rotation of said cam drive assembly with the continuous cam track having an axial length exceeding the axial length of the longest of said separate cam track sections, drive means carried by only one of said bed sections and operably connected to said cam drive assembly for rotating said cam drive assembly on said longitudinal axis thereof, and a cam follower connected to said table and adapted to engage each of said separate cam track sections of said continuous cam track in succession, whereby rotation of said cam drive assembly by said drive means can traverse said table across both of said bed sections.

2. The shuttle of claim 1 wherein said cam tracks of said first and second sections of said cam drive assembly are designed to traverse said table across said bed sections with an accelerating and decelerating motion.

3. The shuttle of claim 1 wherein each of said first and second sections of said cam drive assembly comprises a separate tube with a generally cylindrical side wall and said cam track section thereof comprises a slot extending generally radially through said side wall of said tube, and each of said first and second sections of said cam drive assembly also comprises supports fixed to said tube for mounting said tube for rotation on its longitudinal axis such that each of said first and second sections of said cam drive assembly has in assembly a hollow space therein such that each of said first and second sections of said cam drive assembly has less mass than a solid section of the same size and material.

4. The shuttle of claim 3 which also comprises at least one separate extension section interposed between and fixedly connected to first and second longitudinally spaced apart bed sections to carry said table when traversed between said first and second bed sections.

5. An adjustable length cam shuttle comprising at least two separate bed sections, said bed sections being separate from each other and retained in fixed alignment with each other to carry a table for reciprocable movement thereon, a table carried by said bed sections for generally reciprocable movement with respect to said bed sections, a generally cylindrical cam drive assembly carried by at least two bed sections for rotation on its longitudinal axis, said cam drive assembly having at least first, second, and third separate sections aligned on a common axis of rotation with each section having a separate cam track section thereon, said separate cam track sections being aligned with each other to provide a continuous cam track coiled about and extending along the common axis of rotation of said cam drive assembly with said continuous cam track having an axial length exceeding the axial length of the longest of said separate cam track sections.

6. The shuttle of claim 5 wherein said cam track sections of said first, second and third sections of said cam drive assembly are designed to traverse said table across said bed sections with an accelerating, constant speed and decelerating motion.

7. The shuttle of claim 6 which also comprises at least one separate extension section interposed between and fixedly connected to first and second longitudinally spaced apart bed sections to carry said table when traversed between said first and second bed sections.

8. The shuttle of claim 5 which also comprises at least one separate extension section interposed between and fixedly connected to first and second longitudinally spaced apart bed sections to carry said table when traversed between said first and second bed sections.

9. The shuttle of claim 5 wherein said third section of said cam drive assembly comprises a tube and said cam track section thereof comprises a slot extending generally radially through a side wall of said tube of said third section of said cam drive assembly and said third section of said cam drive assembly also comprises supports fixed to said tube for mounting said tube for rotation on its longitudinal axis such that said third section of said cam drive assembly has in assembly a hollow space therein such that said third section of said cam drive assembly has less mass than a solid section of the same size and material.

10. The shuttle of claim 9 wherein each of said first and second sections of said cam drive assembly comprises a separate tube with a generally cylindrical sidewall and supports fixed to said tube and said cam track section thereof comprises a slot extending generally radially through said sidewall of said tube.

11. The shuttle of claim 9 which also comprises at least one separate extension section interposed between and fixedly connected to first and second longitudinally spaced apart bed sections to carry said table when traversed between said first and second bed sections.

12. The shuttle of claim 10 which also comprises at least one separate extension section interposed between and fixedly connected to first and second longitudinally spaced apart bed sections to carry said table when traversed between said first and second bed sections.

13. A cam drive assembly comprising at least first and second separate tubular sections for rotation on a common longitudinal axis, each of said first and second tubular sections having a slot extending generally radially through a side wall thereof providing a cam track section therein, said cam track sections of said tubular sections being aligned with each other to provide a continuous cam track generally coiled about and extending along the common longitudinal axis of said cam drive assembly with an axial length exceeding the axial length of the longest of said cam track sections, and supports fixed to each of said separate tubular sections for mounting each said tubular section for rotation on its longitudinal axis such that each of said separate tubular sections of said cam drive assembly has in assembly a hollow space therein such that each of said separate tubular sections has less mass than a solid section of the same size and material.

14. The cam drive assembly of claim 13 wherein said cam track sections of said first and second tubular sections are designed to traverse a follower engaging the cam track with an accelerating and decelerating motion.

15. A cam drive assembly comprising at least first and second generally cylindrical separate sections mountable for rotation on a common longitudinal axis, each of said generally cylindrical separate sections having a cam track section thereon, said cam track sections being aligned with each other to provide a continuous cam track generally coiled about and extending along the common longitudinal axis of said cam drive assembly with an axial length exceeding the axial length of the longest of said separate cam track sections, at least one of said generally cylindrical sections comprising a tube having a side wall with a slot extending generally radially through said sidewall of said tube providing said cam track section associated with said one generally cylindrical section, and supports fixed to said tube for mounting said tube for rotation on its longitudinal axis such that said one generally cylindrical section has in assembly a hollow space therein, such that said one generally cylindrical section has less mass than a solid section of the same size and material.

16. A cam drive assembly comprising at least first, second, and third generally cylindrical separate sections alignable for rotation on a common longitudinal axis, each of said generally cylindrical separate sections having a cam track section thereon, said cam track sections being aligned with each other to provide a continuous cam track generally coiled about and extending along the common longitudinal axis of said cam drive assembly with said continuous cam track having an axial length exceeding the axial length of the longest of said separate cam track sections, at least one of said generally cylindrical sections comprising a tube having a sidewall with a slot extending generally radially through said side wall of said tube to provide said cam track section associated with said one generally cylindrical section, and supports fixed to said tube for mounting said one generally cylindrical section for rotation on its generally longitudinal axis such that said one generally cylindrical section has in assembly a hollow space therein such that said one generally cylindrical section has less mass than a solid section of the same size and material.

17. The cam drive assembly of claim 16 wherein said cam track sections of said first and second generally cylindrical sections are of a standard design imparting a predetermined accelerating and decelerating motion adjacent the ends of the traverse of a follower engaging the cam track of the cam drive assembly and the pitch of said cam track section of said third generally cylindrical section is specifically designed for imparting a predetermined traversing motion to the follower between the accelerating and decelerating motions imparted to the follower adjacent the ends of the traverse thereof.

18. The cam drive assembly of claim 16 wherein said first and second generally cylindrical sections are of a standard design and said third generally cylindrical section is especially designed with a predetermined overall length providing the cam drive assembly with a preselected overall length of traverse of a follower engaging the continuous cam track.

19. An adjustable length cam shuttle comprising at least two separate bed sections longitudinally spaced apart from each other, at least one separate extension section interposed between and fixedly connected to said longitudinally spaced apart bed sections, said bed sections and said extension section being separable from each other and retained in fixed alignment with each other to carry a table for reciprocable movement thereon, a table carried by said bed sections and said extension section for generally reciprocable movement with respect thereto, a generally cylindrical cam drive assembly carried by at least two bed sections for rotation on its longitudinal axis, said cam drive assembly having at least first and second separate sections aligned on a common axis of rotation of said cam drive assembly with the continuous cam track having an axial length exceeding the axial length of the longest of said separate cam track sections, drive means carried by one of said bed sections and operably connected to said cam drive assembly for rotating said cam drive assembly on said longitudinal axis thereof, and a cam follower connected to said table and adapted to successively engage each of said separate cam track sections of said continuous cam track, whereby rotation of said cam drive assembly by said drive means can traverse said table across said bed sections and said extension section.

20. The shuttle of claim 19 which also comprises a pair of laterally spaced and longitudinally extending parallel ways each having first, second, and third sections carried by one of said bed sections, said extension section, and the other of said bed sections, respectively, and said table is mounted on said ways for generally reciprocal movement thereon.

21. A cam drive assembly comprising at least first, second, and third separate tubular sections alignable for rotation on a common longitudinal axis, each of said first, second, and third tubular sections having a slot extending generally radially through a sidewall thereof providing a cam track section therein, said cam track sections of said tubular sections being aligned with each other to provide a continuous cam track generally coiled about and extending along the common longitudinal axis of said cam drive assembly with said continuous cam track having an axial length exceeding the axial length of the longest of said cam track sections, and supports fixed to each of said separate tubular sections for mounting each said tubular section for rotation on its longitudinal axis such that each of said separate tubular sections of said cam drive assembly has in assembly a hollow space therein, such that each of said separate tubular sections has less mass than a solid section of the same size and material.

22. The cam drive assembly of claim 21 wherein said cam track sections of said first, second and third tubular sections are designed to traverse a follower engaging the cam track with an accelerating, constant speed and decelerating motion.

23. The cam drive assembly of claim 21 wherein said first and second tubular sections are of a standard design and said third tubular section is specially designed with a predetermined overall length providing the cam drive assembly with a preselected overall length of traverse of a follower engaging the cam track.

24. The cam drive assembly of claim 23 wherein said cam track sections of said first and second tubular secions are of a standard design imparting a predetermined accelerating and decelerating motion adjacent the ends of the traverse of a follower engaging the cam track of the cam drive assembly and the pitch of said cam track section of said third tubular section is specifically designed for imparting a predetermined traversing motion to the follower between the accelerating and decelerating motion imparted to the follower adjacent the ends of the traverse thereof.

* * * * *